E. T. GOVE.
AUTOMOBILE ACCESSORY
APPLICATION FILED JAN. 27, 1920.
1,361,321.
Patented Dec. 7, 1920.
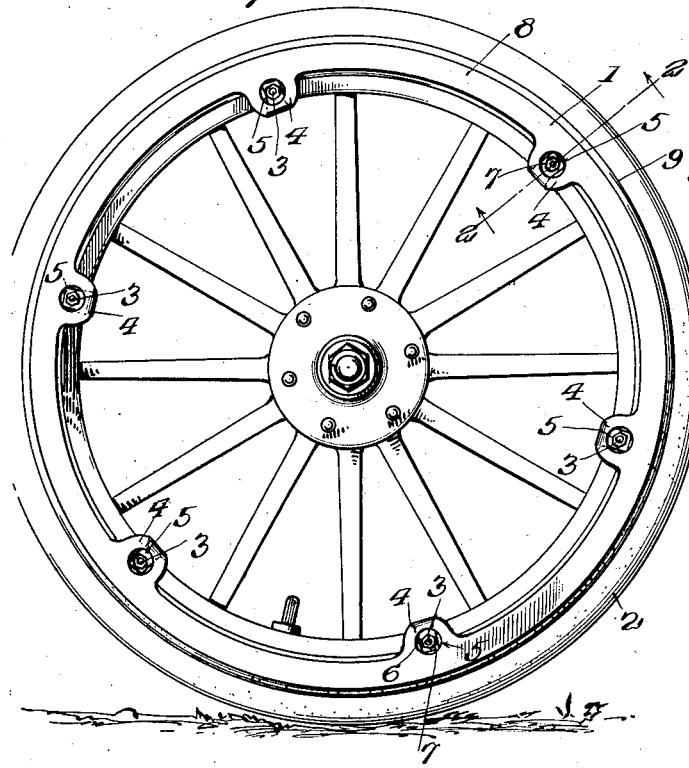
Fig. 1.
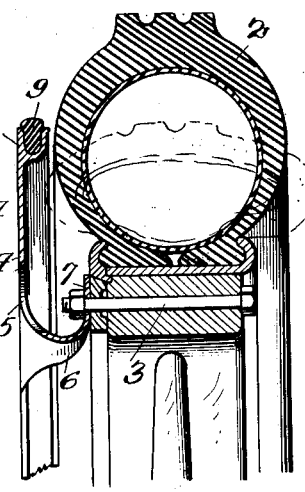
Fig. 2.
Fig. 5.
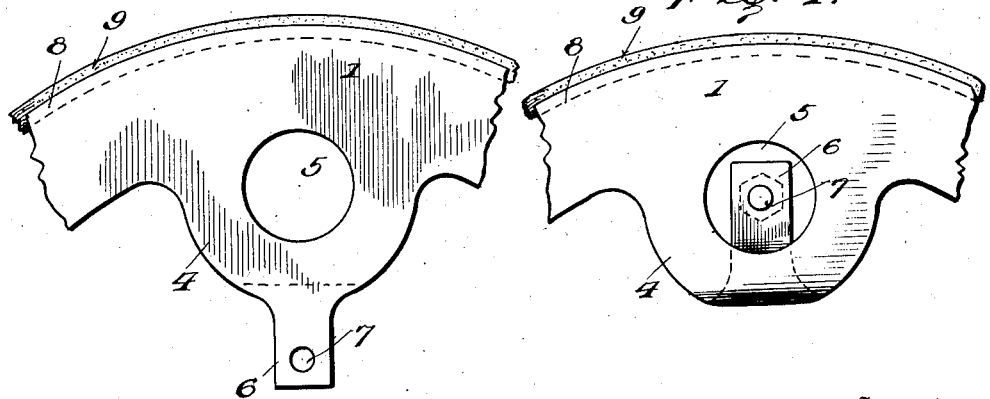
Fig. 3.
Fig. 4.
Inventor
Emery T. Gove.
By
his Attorneys.

UNITED STATES PATENT OFFICE.

EMERY T. GOVE, OF BERKELEY, CALIFORNIA.

AUTOMOBILE ACCESSORY.

1,361,321.  Specification of Letters Patent.  Patented Dec. 7, 1920.

Application filed January 27, 1920. Serial No. 354,396.

*To all whom it may concern:*

Be it known that I, EMERY T. GOVE, a citizen of the United States, residing at Berkeley, in the county of Alameda and State of California, have invented certain new and useful Improvements in Automobile Accessories; and I do hereby declare the following to be a full, clear, and exact description of the invention, such as will enable others skilled in the art to which it appertains to make and use the same.

This invention consists of an improved attachment for automobile wheels capable of accomplishing two purposes. Normally it is a guard to protect the tire shoe from injury caused by scraping against a curb. When a tire is deflated or "flat" under conditions which do not permit of repairs the attachment will act as a tread surface and prevent the rim cutting the shoe and tube.

Figure 1 is a side elevation of a wheel with my improved feature attached. Fig. 2 is a cross section on line 2—2. Fig. 1. Figs. 3 and 4 are fragmentary details. Fig. 5 is a slight modification.

The device comprises a ring 1 adapted to be secured adjacent the outer face of a wheel tire or shoe 2. Its outer edge terminates well within the diameter of the fully inflated tire so as to avoid interfering with the proper cushion action in traveling under normal conditions.

The modern automobile wheel is equipped with bolts 3 by which the rim is secured to the felly. I utilize these bolts as appropriate means for securing the ring 1. As shown in detail in Fig. 3, the ring is formed with a series of inward extending flanges 4 corresponding in number and location to the bolts 3. These flanges are formed with holes 5 and at their inner ends they are reduced to form lugs 6 having holes 7 large enough to admit the bolts 3. These lugs are bent into the position shown in Fig. 4 and the larger holes 5 permit of the operator inserting his fingers to manipulate the nuts on the ends of the bolts. When thus secured the flanges 4 and the ring body are spaced apart from the lugs 6 and the tire, as shown in Fig. 2. This permits sufficient resiliency so that when the wheel scrapes against a curb the wear will be taken up by the ring without undue strain. It is customary to provide modern cars with "left drives" that is the operator and his mechanism are at the left side of the front seat. In drawing up to a curb on the right hand side of a street the operator cannot well see the curb and has to guess at the distance between his wheels and the curb. Considerable injury is caused by the scraping when the distance is overestimated. My invention avoids this.

I have shown the ring 1 formed with a peripheral channel 8 in which a hard rubber tire 9 is seated. When a tire bursts and assumes the dotted line form indicated in Fig. 2 the ring 1 and tire 9 will form a temporary tread surface, saving the shoe and inner tube from injury by the rim until repairs can be made.

The structure of Fig. 5 is adapted to wheels having wire spokes. The form of the ring is the same but the bolt 10, which does not occur in wire wheels, carries a clamp 12 at its extremity and a second clamp 13 to bear against lug 6 and against the tire rim 14. The two clamps are preferably formed with serrated surfaces to grip the rim.

I claim as my invention:

1. The combination with a wheel having a series of bolts extending transversely thereof near its periphery, of a ring on the outer face of said wheel having a series of flanges, formed with holes and having lugs at their inner ends bent back upon the flanges and formed with relatively smaller holes in line with said former holes and adapted to receive said bolts.

2. As an article of manufacture, an automobile tire guard comprising a ring having a series of inward extending flanges, lugs at the inner extremities of said flanges and bent back upon, and spaced from, the flanges, registering holes being formed in the flanges and their respective lugs, means for securing said lugs to a wheel, a channel in the periphery of said ring, and a tire in said channel.

3. As an article of manufacture, an automobile tire guard comprising a ring having a series of inward extending flanges, lugs at the inner extremities of said flanges and bent back upon, and spaced from, the flanges, registering holes being formed in the flanges and their respective lugs, a bolt extending through each of said lugs, a clamp on said bolt intermediate said lug and the tire rim, a second clamp on said bolt bearing against the opposite edge of said tire rim, and a nut on said bolt between said flange and said lug.

In testimony whereof I have signed this specification.

EMERY T. GOVE.